(12) United States Patent     (10) Patent No.:   US 12,662,591 B2

Zhao et al.     (45) Date of Patent:     Jun. 23, 2026

(54) COMBINATION COMPRISING TWO PROPYLENE-BASED POLYMERS AND COMPOSITIONS COMPRISING THE SAME

(71) Applicant: EXXONMOBIL CHEMICAL PATENTS INC., Baytown, TX (US)

(72) Inventors: Bin Zhao, Songjing (CN); Li Zu Wang, Shanghai (CN); Yi Peng, Shanghai (CN)

(73) Assignee: EXXONMOBIL CHEMICAL PATENTS INC., Baytown, TX (US)

( * ) Notice: Subject to any disclaimer, the term of this patent is extended or adjusted under 35 U.S.C. 154(b) by 603 days.

(21) Appl. No.: 17/998,776

(22) PCT Filed: Jun. 9, 2021

(86) PCT No.: PCT/US2021/036521

§ 371 (c)(1),
(2) Date: Nov. 14, 2022

(87) PCT Pub. No.: WO2021/257335

PCT Pub. Date: Dec. 23, 2021

(65)       Prior Publication Data

US 2023/0340242 A1     Oct. 26, 2023

Related U.S. Application Data

(60) Provisional application No. 63/038,997, filed on Jun. 15, 2020.

(51) Int. Cl.
*C08L 23/12*      (2006.01)
*C08F 210/06*     (2006.01)

(52) U.S. Cl.
CPC ............ *C08L 23/12* (2013.01); *C08F 210/06* (2013.01); *C08L 2205/025* (2013.01); *C08L 2205/035* (2013.01)

(58) Field of Classification Search
CPC ...... C08F 2/001; C08F 210/06; C08F 210/16; C08F 2500/12; C08F 2500/17; C08F 2500/27; C08F 2500/30; C08F 2500/31; C08F 4/6465; C08F 4/652; C08L 2205/025; C08L 2205/035; C08L 2207/02; C08L 23/0815; C08L 23/12; C08L 23/14
See application file for complete search history.

(56)       References Cited

U.S. PATENT DOCUMENTS

| | | | |
|---|---|---|---|
| 7,445,827 B2 * | 11/2008 | Le | ......................... C08K 5/0083 264/513 |
| 2010/0010142 A1 | 1/2010 | Noh et al. | |
| 2017/0267794 A1 * | 9/2017 | Lin | ...................... C08F 210/06 |

FOREIGN PATENT DOCUMENTS

| | | |
|---|---|---|
| EP | 1788022 A1 | 5/2007 |
| EP | 1818365 A1 | 8/2007 |

OTHER PUBLICATIONS

Written Opinion and International Search Report for corresponding PCT Application No. PCT/US2021/036521 mailed Sep. 1, 2021.

* cited by examiner

*Primary Examiner* — Latosha Hines

(74) *Attorney, Agent, or Firm* — Vorys, Sater, Seymour and Pease LLP

(57)       ABSTRACT

A combination comprises two propylene-based polymers which can provide flexibility in adjusting shrinkage rate of components comprising such combination.

20 Claims, 3 Drawing Sheets

COMBINATION COMPRISING TWO PROPYLENE-BASED POLYMERS AND COMPOSITIONS COMPRISING THE SAME

CROSS-REFERENCE OF RELATED APPLICATIONS

This application claims priority to and the benefit of U.S. Ser. No. 63/038,997, filed Jun. 15, 2020, the disclosure of which is incorporated herein by reference.

FIELD OF THE INVENTION

This invention relates generally to a combination comprising two propylene-based polymers with different shrinkage rates, a composition comprising the combination as well as a component comprising the composition and a method for preparing the component.

BACKGROUND OF THE INVENTION

In automobile compounding industry, it is very common to have shrinkage change challenges when automobile OEM want to use the formulations to produce different components or produce a component by using different equipment. There will always be small shrinkage differences due to either the component design or the total short size or even different injection equipment. Those shrinkage differences can be in the range from 0.2% to 0.3%. To eliminate the shrinkage difference, current practice in the market is to adjust the amount of talc or polyolefin or polypropylene in the formulation to reformulate the formulation and re-test and re-qualify it according to different shrinkage requirement. This brings extra cost, extra time and extra resource requirement.

There is still a need for a new combination, composition or process to prepare the component having suitable shrinkage rate with reduced cost and time.

SUMMARY OF THE INVENTION

In a first general aspect, this disclosure provides a combination comprising a first propylene-based polymer and a second propylene-based polymer, wherein the shrinkage rate of the first propylene-based polymer is higher than the shrinkage rate of the second propylene-based polymer by at least 15%, based on the shrinkage rate of the second propylene-based polymer.

In a second general aspect, this disclosure provides a composition comprising the combination according to the present invention.

In a third general aspect, this disclosure provides a component comprising the composition according to the present invention.

In a fourth general aspect, this disclosure provides a process for making a component, comprising the steps of:
  (a) setting a target shrinkage rate;
  (b) preparing a component comprising the composition according to the present invention; and
  (c) adjusting the weight ratio of the first propylene-based polymer to the second propylene-based polymer to obtain the target shrinkage rate.

In a fifth general aspect, this disclosure provides a propylene-based impact copolymer (ICP) comprising a polypropylene homopolymer and within the range of from about 15 to about 22 wt % of a propylene copolymer based on the weight of the ICP, wherein the propylene copolymer is an ethylene-propylene copolymer comprising from about 30 to about 45 wt % ethylene-derived units and the remainder propylene-derived units, based on the weight of the propylene copolymer.

Certain aspects of the first, second, third, fourth and fifth general aspects may include one or more of the following features.

In some aspects, the shrinkage rate of the first propylene-based polymer is higher than the shrinkage rate of the second propylene-based polymer by at least 20%, preferably by at least 25%, more preferably by at least 30%, based on the shrinkage rate of the second propylene-based polymer.

In some aspects, the first and the second propylene-based polymers satisfy the following: (i) the difference in the notched izod impact strength between the first propylene-based polymer and the second propylene-based polymer is no more than 20%, preferably no more than 10%, based on the lower notched izod impact strength; and (ii) the difference in flexural modulus between the first propylene-based polymer and the second propylene-based polymer is no more than 20%, preferably no more than 10%, based on the lower flexural modulus.

In some aspects, the first and the second propylene-based polymers satisfy at least one of the following: (i) the difference in melt flow rate of the first propylene-based polymer and the second propylene-based polymer is no more than 20%, preferably no more than 10%, based on the lower melt flow rate; (ii) the difference in the tensile strength at yield between the first propylene-based polymer and the second propylene-based polymer is no more than 20%, preferably no more than 10%, based on the lower tensile strength at yield; and (iii) the difference in the tensile stress at yield between the first propylene-based polymer and the second propylene-based polymer is no more than 20%, preferably no more than 10%, based on the lower tensile stress at yield.

In some aspects, the first and the second propylene-based polymers satisfy at least one of the following: (i) the difference in the notched izod impact strength between the first propylene-based polymer and the second propylene-based polymer is more than 20%, preferably more than 30%, based on the lower notched izod impact strength; and (ii) the difference in flexural modulus between the first propylene-based polymer and the second propylene-based polymer is more than 20%, preferably more than 30%, based on the lower flexural modulus.

In some aspects, the first and the second propylene-based polymers satisfy at least one of the following: (i) the difference in melt flow rate of the first propylene-based polymer and the second propylene-based polymer is more than 20%, preferably more than 30%, based on the lower melt flow rate; and (ii) the difference in the tensile strength at yield between the first propylene-based polymer and the second propylene-based polymer is more than 20%, preferably more than 30%, based on the lower tensile strength at yield; and (iii) the difference in the tensile stress at yield between the first propylene-based polymer and the second propylene-based polymer is more than 20%, preferably more than 30%, based on the lower tensile stress at yield.

In some aspects, the first propylene-based polymer and the second propylene-based polymer are selected from propylene homopolymer, propylene copolymer and impact copolymer (ICP).

In some aspects, the first propylene-based polymer and the second propylene-based polymer are both ICP.

In some aspects, the ICP as the first propylene-based polymer comprises a polypropylene homopolymer and within the range of from about 8 to about 25 wt % of a propylene copolymer based on the weight of the ICP, wherein the propylene copolymer comprises from about 25 to about 60 wt % ethylene and/or $C_4$ to $C_{10}$ α-olefin derived units and the remainder propylene-derived units based on the weight of the propylene copolymer.

In some aspects, the ICP as the second propylene-based polymer comprises a polypropylene homopolymer and within the range of from about 12 to about 40 wt % of a propylene copolymer based on the weight of the ICP, wherein the propylene copolymer comprises from about 30 to about 55 wt % ethylene and/or $C_4$ to $C_{10}$ α-olefin derived units and the remainder propylene-derived units based on the weight of the propylene copolymer.

In some aspects, the propylene copolymer is an ethylene-propylene copolymer present in an amount of about 15 to about 22 wt %, based on the weight of ICP as the second propylene-based polymer.

In some aspects, ethylene-propylene copolymer comprises about 30 to about 45 wt % ethylene-derived units, based on the weight of ethylene-propylene copolymer.

In some aspects, the weight ratio of the first propylene-based polymer to the second propylene-based polymer is in the range from about 10:90 to about 90:10.

In some aspects, the composition further comprises at least one component selected from polyolefin plastomers, polyolefin elastomer and filler.

In some aspects, the total content of the first propylene-based polymer and the second propylene-based polymer is in the range from about 45 to about 80 wt %, preferably from about 55 to about 75 wt %, based on the weight of the composition.

In the fourth aspect, step (c) comprises increasing the weight ratio of the first propylene-based polymer to the second propylene-based polymer when the shrinkage rate of the component in step (b) is lower than the target shrinkage rate.

In the fourth aspect, step (c) comprises decreasing the weight ratio of the first propylene-based polymer to the second propylene-based polymer when the shrinkage rate of the component in step (b) is higher than the target shrinkage rate.

In the fifth aspect, the shrinkage rate of the ICP is less than 1.5%, preferably less than 1.4%.

In the fifth aspect, the ICP has at least one of the following properties: (i) a melt flow rate (MFR) (230° C./2.16 kg, ASTM D1238) of about 45 to about 55 g/10 min, (ii) an MFR of the polypropylene homopolymer of about 100 to about 130 g/10 min, and (iii) an intrinsic viscosity of the propylene copolymer of about 1.8 to about 4 dL/g.

In the fifth aspect, the ICP further comprises a filler in an amount of from about 0.2 to about 1 wt %, based on the weight of ICP.

DETAILED DESCRIPTION OF THE INVENTION

Figure 1:
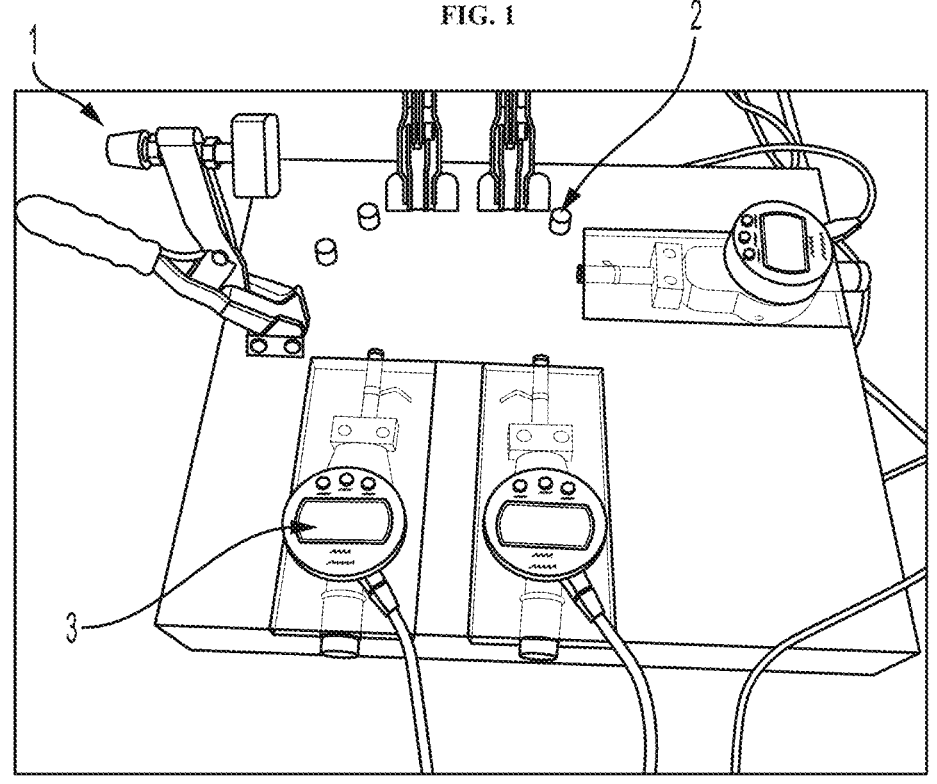
FIG. 1 shows the photo for testing the shrinkage rate. 1: clamp (×6), 2: Locator (×3); 3: micro gauge.

Various specific embodiments, versions, and examples are described herein; including exemplary embodiments and definitions that are adopted for purposes of understanding the claimed invention. While the following detailed description gives specific preferred embodiments, those skilled in the art will appreciate that these embodiments are exemplary only and that the invention can be practiced in other ways. For purposes of determining infringement, the scope of the invention will refer to any one or more of the appended claims, including their equivalents, and elements or limitations that are equivalent to those that are recited. Any reference to the "invention" may refer to one or more, but not necessarily all, of the inventions defined by the claims.

As used herein, the term "copolymer" is meant to include polymers having two or more monomers, optionally, with other monomers, and may refer to interpolymers, terpolymers, etc. The term "polymer" as used herein includes, but is not limited to, homopolymers, copolymers, terpolymers, etc., and alloys thereof. The term "polymer" as used herein also includes impact, block, graft, random, and alternating copolymers. The term "polymer" shall further include all possible geometrical configurations unless otherwise specifically stated. Such configurations may include isotactic, syndiotactic and atactic symmetries.

"Propylene-based", as used herein, is meant to include any polymer comprising propylene, either alone or in combination with one or more comonomers, in which propylene is the major component (i.e., greater than 50 wt % propylene).

All numerical values within the detailed description and the claims herein are modified by "about" the indicated value, and take into account experimental error and variations that would be expected by those skilled in the art.

The shrinkage rate can be tested as follows:

1) The sample bars are prepared by injection molding at 170° C. Four different holding pressure, i.e. 20 MPa, 30 MPa, 40 MPa and 50 MPa are used for each material in order to produce four sample bars, wherein the holding pressure is the pressure that holds the material feed after the material has been injected into mold cavity. The sample bars are conditioned at 23±2° C. for 48 hours before testing. The shrinkage rate test is taken under the same condition of 23±2° C.

2) After conditioning, the size of sample bar is tested. 12 tests are carried out for each sample bar.

3) The Shrinkage rate is calculated according to following equation:

$$\text{Shrinkage rate} = L_0 - L_1 / L_0 * 100\%$$

wherein $L_0$ is the size of mold cavity and $L_1$ is the size of sample bar.

The shrinkage rate is the average of flow/cross flow direction. The shrinkage rate reported for each material is the average shrinkage rate of four sample bars prepared under above mentioned four different holding pressure.

For example, the shrinkage rate can be tested by Shrink Plaque Checking Fixture (Manufacturer: U-Micro tooling Co., Ltd.).

In one embodiment, the shrinkage rate of the first propylene-based polymer is higher than the shrinkage rate of the second propylene-based polymer by at least 18%, at least 20%, at least 22%, at least 25%, at least 28%, at least 30%, or at least 33%, based on the shrinkage rate of the second propylene-based polymer. Usually, the shrinkage rate of the first propylene-based polymer is higher than the shrinkage rate of the second propylene-based polymer by no more than 50%, no more than 48%, no more than 45%, no more than 43%, no more than 40%, no more than 38%, no more than 35%, based on the shrinkage rate of the second propylene-based polymer.

In one embodiment, the first propylene-based polymer and the second propylene-based polymer have similar physical properties, such as notched izod impact strength, flexural modulus, melt flow rate, tensile strength at yield and/or tensile stress at yield. They are called as twin propylene-based polymers. By using these propylene-based polymers, the compounder can easily adjust the shrinkage rate of the component with its physical properties keeping unchanged.

In one embodiment, the difference in the notched izod impact strength between the first propylene-based polymer and the second propylene-based polymer is no more than 20%, no more than 18%, no more than 15%, no more than 12%, no more than 10%, no more than 8%, or no more than 5%, based on the lower notched izod impact strength. The notched izod impact strength can be tested according to ISO180 for example at 23° C.

In one embodiment, the difference in flexural modulus between the first propylene-based polymer and the second propylene-based polymer is no more than 20%, no more than 18%, no more than 15%, no more than 12%, no more than 10%, no more than 8%, or no more than 5%, based on the lower flexural modulus. The flexural modulus can be tested at 2 mm/min strain rate according to ISO178.

In one embodiment, the difference in melt flow rate (MFR) of the first propylene-based polymer and the second propylene-based polymer is no more than 20%, no more than 18%, no more than 15%, no more than 12%, no more than 10%, no more than 8%, or no more than 5%, based on the lower melt flow rate. MFR can be determined according to ASTM D1238, at 2.16 kg and 230° C.

In one embodiment, the difference in the tensile strength at yield between the first propylene-based polymer and the second propylene-based polymer is no more than 20%, no more than 18%, no more than 15%, no more than 12%, no more than 10%, no more than 8%, or no more than 5%, based on the lower tensile strength at yield. The tensile strength at yield can be tested according to ISO527 at 23° C.

In one embodiment, the difference in the tensile stress at yield between the first propylene-based polymer and the second propylene-based polymer is no more than 20%, no more than 18%, no more than 15%, no more than 12%, no more than 10%, no more than 8%, or no more than 5%, based on the lower tensile stress at yield. The tensile stress at yield can be tested according to ISO527 at 23° C.

In one embodiment, the first and the second propylene-based polymers satisfy at least one, preferably at least two, more preferably at least three, most preferably all of the following: the difference in (i) notched izod impact strength, (ii) flexural modulus, (iii) melt flow rate and (iv) tensile strength at yield (or tensile stress at yield) of the first propylene-based polymer and the second propylene-based polymer is no more than 20%, no more than 18%, or no more than 15%, in each case based on the lower value.

In one embodiment, the first propylene-based polymer and the second propylene-based polymer have different physical properties, such as at least one of notched izod impact strength, flexural modulus, melt flow rate, tensile strength at yield and tensile stress at yield. They are called as partner propylene-based polymers. By using these propylene-based polymers, the compounder can easily adjust the shrinkage rate of the component and change the physical properties of the component at the same time.

In one embodiment, the difference in the notched izod impact strength between the first propylene-based polymer and the second propylene-based polymer is more than 20%, more than 30%, more than 40%, more than 50%, more than 60%, more than 70%, more than 80%, more than 90%, more than 100%, more than 150%, more than 200%, more than 300%, more than 400%, or more than 500%, based on the lower notched izod impact strength.

In one embodiment, the difference in flexural modulus between the first propylene-based polymer and the second propylene-based polymer is more than 20%, more than 25%, more than 30%, more than 35%, more than 40%, more than 45%, more than 50%, more than 55%, or more than 60%, based on the lower flexural modulus.

In one embodiment, the difference in melt flow rate of the first propylene-based polymer and the second propylene-based polymer is more than 20%, more than 30%, more than 40%, more than 50%, more than 60%, more than 70%, more than 80%, more than 90%, more than 100%, more than 110%, more than 120%, more than 130%, more than 140%, more than 150%, or more than 160%, based on the lower melt flow rate.

In one embodiment, the difference in the tensile strength at yield between the first propylene-based polymer and the second propylene-based polymer is more than 20%, more than 25%, more than 30%, more than 35%, more than 40%, more than 45%, more than 50%, or more than 55%, based on the lower tensile strength at yield.

In one embodiment, the difference in the tensile stress at yield between the first propylene-based polymer and the second propylene-based polymer is more than 20%, more than 25%, more than 30%, more than 35%, more than 40%, more than 45%, more than 50%, or more than 55%, based on the lower tensile stress at yield.

In one embodiment, the first propylene-based polymer and the second propylene-based polymer are selected from propylene homopolymer, propylene copolymer and impact copolymer (ICP).

In one embodiment, the first propylene-based polymer and the second propylene-based polymer are both ICP.

The propylene copolymer can be copolymers of propylene and ethylene or C4 to C10 α-olefins.

ICP comprises a polypropylene homopolymer and within a range of from 10 or 15 or 20, or 22, or 24 wt % to 26, or 28, or 30, or 35, or 40, or 45 wt % of propylene copolymer based on the weight of the ICP, wherein the propylene copolymer comprises from 20, or 25, or 30, or 35 wt % to 40 or 45, or 50, or 55 or 60 wt % ethylene and/or $C_4$ to $C_{10}$ α-olefin (for example 1-butene, 1-hexene, and/or 1-octene) derived units and from 80 to 40 wt % propylene-derived units based on the weight of the propylene copolymer. The propylene copolymer is imbedded in a continuous phase of polypropylene homopolymer.

The ICP can have an MFR (230° C./2.16 kg ASTM D1238) of at least 4, or 6, or 8, or 10, or 15, or 20, or 30, or 40, or 50, or 60, or 80 g/10 min, or within a range from about 4, or 6, or 8, or 10, or 15, or 20, or 30, or 40, or 50, or 60, or 80 g/10 min to about 100, or 130, or 140, or 160, or 180, or 200 g/10 min. The ICP typically has a heat deflection temperature (HDT) (0.45 MPa) within a range from about 75, or 80, or 90, or 100, or 110° C. to about 120, or 130, or 140° C. The HDT can be tested according to ISO 75. The ICP can have a flexural modulus of at least 950, or 1000, or 1100, or 1200, or 1300, or 1400, or 1500, or 1600 or 1700 MPa, or within a range from about 950, or 1000, or 1100, or 1200, or 1300, or 1400, or 1500, or 1600, or 1700 MPa to about 1750, or 1800, or 1840, or 1880, or 1900, or 1940, or 2000 MPa. The ICP can have a notched Izod impact strength of at least 5, or 6, or 8, or 10, or 15, or 20, or 25, or 30, or 40, or 50, or 60 kJ/m².

In one embodiment, the ICP as the first propylene-based polymer comprises a polypropylene homopolymer and within the range of from about 8 to about 25 wt %, preferably from about 10 to about 22 wt % of a propylene copolymer based on the weight of the ICP, wherein the propylene copolymer comprises from about 25 to about 60 wt %, preferably from 30 to about 55 wt % ethylene and/or $C_4$ to $C_{10}$ α-olefin derived units and the remainder propylene-derived units based on the weight of the propylene copolymer.

In one embodiment, the ICP as the second propylene-based polymer comprises a polypropylene homopolymer and within the range of from about 12 to about 40 wt %, preferably from about 15 to about 35 wt % of a propylene copolymer based on the weight of the ICP, wherein the propylene copolymer comprises from about 30 to about 55 wt % ethylene and/or $C_4$ to $C_{10}$ α-olefin derived units and the remainder propylene-derived units based on the weight of the propylene copolymer. This ICP can have an MFR (230° C./2.16 kg ASTM D1238) within a range from about 40, or 42, or 44, or 46, or 48 g/10 min to about 52, or 54, or 56, or 50, or 60 g/10 min. The propylene copolymer can be an ethylene-propylene copolymer present in an amount of about 15 to about 22 wt %, based on the weight of ICP as the second propylene-based polymer. The ethylene-propylene copolymer can comprise about 30 to about 45 wt %, preferably about 30 to about 40 wt % ethylene-derived units, based on the weight of the ethylene-propylene copolymer.

The ICPs suitable for use in the present invention may be prepared by conventional polymerization techniques. For example, the ICP may be produced using a two-step gas phase process using Ziegler-Natta catalysis, an example of which is described in U.S. Pat. No. 4,379,759.

The ICPs described herein can also be produced in series reactors wherein the polypropylene homopolymer is first produced in one or more slurry reactors by contacting a catalyst and monomers, preferably propylene, such as in slurry-loop reactors well known in the art, followed by combining the same catalyst and formed homopolymer in a single gas-phase reactor with monomers, preferably propylene and ethylene and/or $C_4$ to $C_{10}$ α-olefins, to produce the propylene copolymer such that the copolymer imbeds itself in the homopolymer as discrete domains with the homopolymer as a matrix or "continuous" phase. The MFR of the individual components can be controlled by, for example, addition and removal of hydrogen from the reactors. Most preferably, the homopolymer is produced in two loop-slurry reactors in series and each as a similar or same amount of hydrogen, producing homopolymer of nearly the same or the same MFR. The amount of hydrogen in the gas phase reactor may be the same or different from the loop slurry reactor, such level controlled by removing the hydrogen from the homopolymer stream entering the gas phase reactor or at some other stage. A suitable process and apparatus are described in U.S. Pat. Nos. 9,000,106 and 8,076,419 (column 6, line 6 to column 7, line16). The systems and processes disclosed therein can be used in a "balanced" reactor scheme where two slurry loop reactors in series forming the polypropylene homopolymer are under the same or similar conditions, followed by transfer of the crystalline polymer (polypropylene homopolymer) to a single gas phase reactor to form the semi-crystalline polymer (propylene copolymer).

In one embodiment, the ICP is prepared by using a Ziegler-Natta catalyst system with a blend of electron donors as described in U.S. Pat. No. 6,087,459 or U.S. Patent Application Publication No. 2010/0105848. In one embodiment, the ICP may be prepared using a succinate Ziegler-Natta type catalyst system.

Metallocene-based catalyst systems may also be used to produce the ICP described herein. Current particularly suitable metallocenes are those in the generic class of bridged, substituted bis(cyclopentadienyl) metallocenes, specifically bridged, substituted bis(indenyl) metallocenes known to produce high molecular weight, high melting, highly isotactic propylene polymers. Generally speaking, those of the generic class disclosed in U.S. Pat. No. 5,770,753 are suitable.

In one embodiment, the weight ratio of the first propylene-based polymer to the second propylene-based polymer can be in the range from about 10:90, or 20:80, or 30:70, or 40:60 to about 60:40, or 70:30, or 80:20, or 90:10.

A further aspect of the present invention is directed to a composition comprising the combination of the present invention.

The total content of the first propylene-based polymer and the second propylene-based polymer can be in the range from about 45, or 50, or 55, or 60 to about, 70, or 75, or 80, or 85 wt %, preferably from about 55 to about 75 wt %, based on the weight of the composition.

The composition of the present invention can further comprise other polymeric materials and common additives. Desirable polymeric materials include polyolefin plastomers, such as polypropylene homopolymers, polyethylenes (LLDPE, HDPE, LDPE); polyolefin elastomer, such as propylene-based elastomers, elastomers such as EP rubber, EPDM, ethylene-butene copolymer elastomers, butyl rubber, styrenic copolymers and block copolymers, and other impact copolymers, especially so called "high-comonomer" impact copolymers, which are defined as propylene-based impact copolymers having greater than 44 wt % comonomer-derived units in the copolymer portion. Common "additives" include fillers such as talc, carbon black, clay, silica, fatty acids, and other well-known materials, as well as antioxidants, anti-slip agents, pigments, cavitating agents (e.g., calcium carbonate), nucleating agents, curatives for added polymers that are curable, and any other of one or more well-known additives.

In one embodiment, the composition further comprises at least one component selected from polyolefin plastomers, polyolefin elastomer and filler.

Usually, the content of the other polymeric material such as polyolefin plastomers and polyolefin elastomer is less than 20 wt %, or less than 15 wt %, or within the range from about 5 wt %, or 10 to about 15 wt %, or 20 wt %, based on the weight of the composition.

The content of filler, such as the talc can be in the range from about 5 to about 25 wt %, or from about 5 to about 20 wt %, or from 8 to about 15 wt %.

In one embodiment, the first propylene-based polymer and the second propylene-based polymer in the composition are both ICP and the composition comprises a further ICP, a polyolefin elastomer, such as ethylene-butene copolymer and a filler such as talc.

In one embodiment, the further ICP comprises a polypropylene homopolymer and within the range of from about 15 to about 25 wt % of a propylene copolymer based on the weight of the ICP and the propylene copolymer comprises greater than 44 wt % ethylene-derived units based on the weight of the propylene copolymer.

These polymeric materials and additives may be compounded with the polypropylene-based polymer by traditional blending such as in a Brabender mixer, or extruded in a single or double screw extruder.

A further aspect of the present invention is directed to a component comprising the composition of the present invention.

The combination or the composition comprising the combination described herein are suitable for use in processes such as injection molding, blow molding and thermoforming for making useful articles for automotives and appliances. In particular, the inventive combination or the composition comprising the combination can be formed into automotive components, either alone or in a mixture with other polymers, exemplary components can include the interior dashboard, interior side trim, handles, interior door facing and components, exterior bumpers, wheel trim, and various fascia used for decorative purposes.

A further aspect of the present invention is directed to a process for making a component, comprising the steps of:

(a) setting a target shrinkage rate;

(b) preparing a component comprising the composition according to the present invention; and (c) adjusting the weight ratio of the first propylene-based polymer to the second propylene-based polymer to obtain the target shrinkage rate.

In one embodiment, step (c) comprises increasing the weight ratio of the first propylene-based polymer to the second propylene-based polymer when the shrinkage rate of the component in step (b) is lower than the target shrinkage rate.

In one embodiment, step (c) comprises decreasing the weight ratio of the first propylene-based polymer to the second propylene-based polymer when the shrinkage rate of the component in step (b) is higher than the target shrinkage rate.

A fifth aspect of the present invention is directed to a propylene-based impact copolymer (ICP) comprising a polypropylene homopolymer and within the range of from about 15 to about 22 wt % of a propylene copolymer based on the weight of the ICP, wherein the propylene copolymer is an ethylene-propylene copolymer comprising from about 30 to about 45 wt %, preferably from about 30 to about 40 wt % ethylene-derived units and the remainder propylene-derived units, based on the weight of the propylene copolymer. The content of polypropylene in this ICP can be in the range from about 78 to 85 wt %, based on the weight of the ICP.

In one embodiment, the shrinkage rate of the ICP is less than 1.5%, preferably less than 1.4%, or less than 1.35%.

In one embodiment, the ICP has at least one of the following properties: (i) a melt flow rate (MFR) (230° C./2.16 kg, ASTM D1238) of about 45 to about 55 g/10 min, (ii) an MFR of the polypropylene homopolymer of about 100 to about 130 g/10 min, and (iii) an intrinsic viscosity of the propylene copolymer of about 1.8 to about 4 dL/g. The intrinsic viscosity can be measured according to ISO 1628-3:2010.

The ICP can further comprises a filler in an amount of from about 0.2 to about 1 wt %, preferably from about 0.3 to about 0.8 wt %, based on the total weight of ICP.

The filler can be talc, glass, and other minerals.

The ICP in the fifth aspect can be prepared as follows:

1) combining olefins (for example propylene) with a polymerization catalyst and hydrogen in the presence of at least one amino-silane donor to form a polymerization medium,

2) removing hydrogen from the polymerization medium, 3) transferring the polymerization medium to a second reactor, 4) adding the propylene copolymer to the polymerization medium to obtain the ICP, and 5) optionally, adding filler to the polymerization medium.

The "amino-silane" donor is an external electron donor having at least one amine or alkylamine moiety and at least one silane, alkylsilane or siloxane moiety.

The ICP in the fifth aspect of the present invention has low shrinkage rate and good mechanical performance and can be used as the second propylene-based polymer.

The combination, the composition comprising the combination and the process according to the present invention enable the compounder to produce the component having the desired shrinkage rate with reduced cost and time in a very simple way. Meanwhile, the present invention enables the compounder to maintain the mechanical properties, such as notched izod impact strength, flexural modulus, melt flow rate, tensile strength and/or tensile stress, especially notched izod impact strength and flexural modulus of the component when adjusting the shrinkage rate by using two propylene-based polymers having similar mechanical properties, or change the above mentioned mechanical properties of the component when adjusting the shrinkage rate by using two propylene-based polymers having different mechanical properties.

EXAMPLES

Materials

ICP 1P: containing 88 wt % polypropylene homopolymer (PP), and 12 wt % ethylene-propylene copolymer (EP) having 35 wt % ethylene-derived unit; the shrinkage rate is 1.7%;

ICP 2P: containing 73 wt % PP, and 27 wt % EP having 35 wt % ethylene-derived unit; the shrinkage rate is 1.37%;

ICP 1T: containing 82 wt % PP, and 18 wt % EP having 53 wt % ethylene-derived unit; the shrinkage rate is 1.6%;

ICP 2T: containing 18 wt % EP having 39 wt % ethylene-derived unit, 6000 ppm talc and the remainder is polypropylene; the shrinkage rate is 1.3%; MFR (230° C./2.16 kg ASTM D1238) of ICP 2T is 48.92 g/10 min; MFR of polypropylene is 115 g/10 min; Intrinsic Viscosity of EP is 2.5 dL/g measured according to ISO 1628-3:2010.

ICP 3T: containing 82 wt % PP, and 18 wt % EP having 50 wt % ethylene-derived unit; the shrinkage rate is 1.4%;

POE 1 is commercially available from DOW as POE Engage 7467, which is an ethylene-butylene copolymer.

Talc is commercially available from AIHAI as Talc HTP05L, $D_{50}$ is 1.4 μm.

Properties of the Materials

The properties of ICPs and testing method are summarized in the following table 1:

TABLE 1

|  | Method | ICP 1P | ICP 2P | ICP 1T | ICP 2T | ICP 3T |
|---|---|---|---|---|---|---|
| MFR at 2.16 kg and 230° C. (g/10 min) | ASTMD 1238 | 11 | 30 | 50 | 48.92 | 4 |
| Tensile stress at yield at 23° C. (51 mm/min) (MPa) | ISO 527 | 30.8 | 19.9 | 24.7 |  | 23 |
| Tensile strength at yield at 23° C. (MPa) | ISO 527 |  |  | 25.0 | 24.8 |  |
| Flexural modulus (MPa) | ISO 178 | 1680 | 1020 | 1414 | 1216 | 1140 |
| Notched izod impact strength at 23° C. (kJ/m$^2$) | ISO 180 | 6.9 | 46 | 7.4 | 7.83 | 57 |
| HDT/0.45 MPa (° C.) | ISO 75 | 102 | 82.8 | 92 | 78.4 | 82 |
| Shrinkage rate (%) | see below | 1.7 | 1.37 | 1.6 | 1.3 | 1.4 |

HDT: Heat deflection temperature

Test Method For Shrinkage Rate

Methodology: Shrinkage rate is calculated according to following equation:

$$\text{Shrinkage rate} = L_0 - L_1 / L_0 * 100\%$$

wherein $L_0$ is the size of mold cavity and $L_1$ is the size of sample bar.

The sample bars are prepared by Injection Molding Machine (Type: DEMAG Multi 150/500—440 h/80v) according to ASTM standard D4101 at 170° C. Four different holding pressure, i.e. 20 MPa, 30 MPa, 40 MPa and 50 MPa are used for each material in the to produce four sample bars, wherein holding pressure is the pressure that holds the material feed after the material has been injected into mold cavity. The size of the mold cavity for preparing the sample bar is 101.45 mm*152.27 mm and the thickness of the sample bar is 1 cm. The sample bars are conditioned at 23±2° C. for 48 hours before testing. The shrinkage rate test is taken under the same condition of 23±2° C.

The equipment used for testing shrinkage is Shrink Plaque Checking Fixture (Manufacturer: U-Micro tooling Co., Ltd.) (see FIG. 1).

Figure 2:
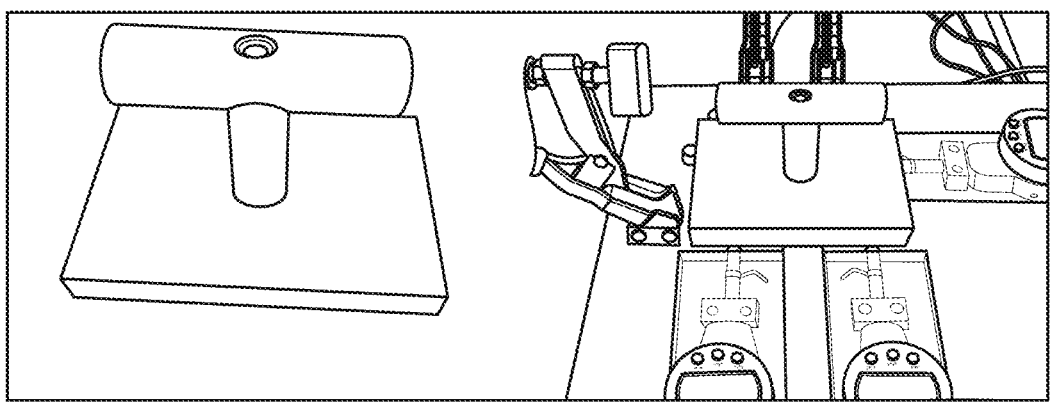
FIG. 2 shows the photos of gage block.

The operations are as follows:

1. Adjusting the zero point from cross flow direction to flow direction with standard gage block; Starting up the micro gauge (Mitutoyo, see FIG. 1);

Putting the standard gage block (see FIG. 2) into the groove and then pushing the zero set the button;

2. Fixing the sample bar to the testing equipment, making sure the sample bar edge touch the 3 locators and clamping the sample bar from gate to the end;

3. Pushing the button of the micro gauge (the DATA button) to record the shrinkage rate of the sample bar. 12 tests are carried out for each sample bar. The shrinkage rate is the average of flow/cross flow direction. The shrinkage rate reported for each material is the average shrinkage rate of four sample bars prepared under above mentioned four different holding pressure.

Preparation Example (for ICP 2T)

Propylene was combined with an amino-silane donor, diethylamino-triethoxysilane, 6600 mppm hydrogen (relative to the propylene and other olefins), and 10 ppm titanium/magnesium-based Ziegler-Natta catalyst (relative to the propylene and other olefins) in a slurry-type polymerization reactor (flow loop reactor). The polypropylene was produced in a series of two continuous flow loop reactors.

The amino-silane donor was present at 40 ppm, an aluminum alkyl (triethylaluminum) was present at 100 ppm (relative to the propylene and other olefins), and the components were combined at a temperature of 70° C. and pressure of 500 psig (3.4 MPa). The loop reactor pressure and temperature were maintained such that the system remained at or below the bubble point. The residence time in the first loop reactor is about 21 min and the residence time in the second loop reactor is about 19 min.

The polypropylene that was produced in the loop reactors was then transferred to a downstream gas phase reactor (GPR) to add an ethylene-propylene copolymer to produce the final impact copolymer product. Hydrogen was removed from the polypropylene containing slurry by a cycling pressure method prior to re-pressurizing and entering the GPR. The pressure in the GPR is 1300 KPaG and the residence time in the GPR is about 34 min. The temperature of GPR is controlled to about 90° C. for low odor. Finally, 6000 ppm talc is added to obtain ICP 2T.

Example 1—Partner ICPs

Figure 3:
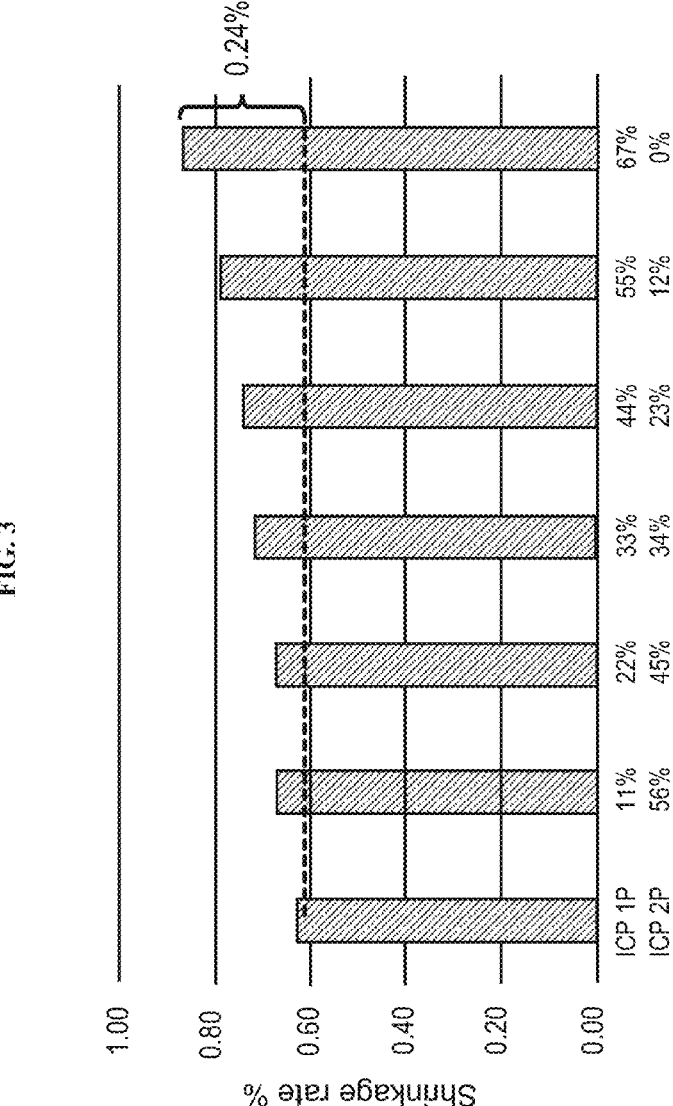
FIG. 3 shows the shrinkage rate of the composition obtained in example 1.

The ICPs, talc and POE are fed to a twin-screw extruder (Leistritz Twin—screw extruder ZSE 40 HP) via different hopper. The amounts of ICPs, talc and POE are shown in table 2. The extruder is operated at 200° C. An underwater pelletizing system is used to cut and prepare the final pellets. The shrinkage rate of each composition tested according to the above method are also shown in table 2 and FIG. 3.

TABLE 2

| Amounts of each component and shrinkage rate | | | | | | | |
|---|---|---|---|---|---|---|---|
| Composition | 1 | 2 | 3 | 4 | 5 | 6 | 7 |
| ICP 2P (part by weight) | 67 | 56 | 45 | 34 | 23 | 12 | 0 |
| ICP 1P (part by weight) | 0 | 11 | 22 | 33 | 44 | 55 | 67 |
| POE 1 (part by weight) | 13 | 13 | 13 | 13 | 13 | 13 | 13 |
| Talc (part by weight) | 20 | 20 | 20 | 20 | 20 | 20 | 20 |
| Shrinkage rate (%) | 0.63 | 0.67 | 0.67 | 0.72 | 0.74 | 0.79 | 0.87 |

According to our results shown in table 2, by changing the ratio between ICP 1P and ICP 2P, the shrinkage rate can vary from 0.63 to 0.87, which is a 0.24% flexibility range. This provides good flexibility to adjust the shrinkage rate of the components.

Example 2—Twin ICPs

The ICPs, talc and POE are fed to a twin-screw extruder (Leistritz Twin—screw extruder ZSE 40 HP) via different hopper. The amounts of ICPs, talc and POE are shown in table 3. The extruder is operated at 200° C. An underwater pelletizing system is used to cut and prepare the final pellets. The shrinkage rate of each composition tested according to the above method are also shown in table 3.

TABLE 3

| Amount of each components and properties | | | |
|---|---|---|---|
| Composition | 8 | 9 | 10 |
| ICP 1T (part by weight) | 60 | 0 | 30 |
| ICP 2T (part by weight) | 0 | 60 | 30 |
| ICP 3T (part by weight) | 10 | 10 | 10 |
| POE 1 (part by weight) | 10 | 10 | 10 |
| Talc (part by weight) | 20 | 20 | 20 |
| MFR at 2.16 kg and 230° C. per ISO 1133 (g/10 min) | 25.61 | 26.84 | 25.78 |
| Flexural modulus per ISO178 (MPa) | 2104 | 1935 | 2071 |
| Tensile stress at yield (51 mm/min) per ISO527 (MPa) | 21.11 | 20.40 | 21.30 |
| Notched izod impact strength at 23° C. per ISO180 (kJ/m$^2$) | 26.48 | 32.65 | 27.18 |
| Notched izod impact strength at −30° C. per ISO180 (kJ/m$^2$) | 5.63 | 5.27 | 5.04 |
| Shrinkage rate (%) | 0.721 | 0.654 | 0.717 |

OTHER EMBODIMENTS

It is to be understood that while the present application has been described in conjunction with the detailed description thereof, the foregoing description is intended to illustrate and not limit the scope of the present application, which is defined by the scope of the appended claims. Other aspects, advantages, and modifications are within the scope of the following claims.

What is claimed is:

1. A combination comprising a first propylene-based polymer and a second propylene-based polymer, wherein the shrinkage rate of the first propylene-based polymer is higher than the shrinkage rate of the second propylene-based polymer by at least 15%, based on the shrinkage rate of the second propylene-based polymer;

wherein the first propylene-based polymer and the second propylene-based polymer are each an impact copolymer (ICP);

wherein the first propylene-based polymer is a first ICP that comprises a first polypropylene homopolymer and about 8 to about 25 wt % of a first propylene copolymer, based on a weight of the first ICP, the first propylene copolymer comprising about 25 wt % to about 60 wt % ethylene and/or C$_4$ to C$_{10}$ α-olefin derived units and the remainder propylene-derived units based on the weight of the first propylene copolymer; and wherein the second propylene-based polymer is a second ICP that comprises a second polypropylene homopolymer and about 12 to about 40 wt % of a second propylene copolymer, based on a weight of the second ICP, the second propylene copolymer comprising about 30 to about 55 wt % ethylene and/or C$_4$ to C$_{10}$ α-olefin derived units and the remainder propylene-derived units based on the weight of the second propylene copolymer; and wherein a difference in notched Izod impact strength between the first propylene-based polymer and the second propylene-based polymer is more than 20% based on the lower notched Izod impact strength.

2. The combination according to claim 1, wherein the shrinkage rate of the first propylene-based polymer is higher than the shrinkage rate of the second propylene-based polymer by at least 20% based on the shrinkage rate of the second propylene-based polymer.

3. The combination according to claim 1, wherein a difference in flexural modulus between the first propylene-based polymer and the second propylene-based polymer is no more than 20%, based on the lower flexural modulus.

4. The combination according to claim 3, wherein the first and the second propylene-based polymers further satisfy at least one of the following: (i) a difference in melt flow rate of the first propylene-based polymer and the second propylene-based polymer is no more than 20%, based on the lower melt flow rate; (ii) a difference in tensile strength at yield between the first propylene-based polymer and the second propylene-based polymer is no more than 20%, based on the lower tensile strength at yield; and (iii) a difference in tensile stress at yield between the first propylene-based polymer and the second propylene-based polymer is no more than 20%, based on the lower tensile stress at yield.

5. The combination according to claim 1, wherein the first and the second propylene-based polymers satisfy at least one of the following: (i) the difference in the notched Izod impact strength between the first propylene-based polymer and the second propylene-based polymer is more than 30%, based on the lower notched Izod impact strength; and (ii) a difference in flexural modulus between the first propylene-based polymer and the second propylene-based polymer is more than 20%, based on the lower flexural modulus.

6. The combination according to claim 5, wherein the first and the second propylene-based polymers further satisfy at least one of the following: (i) a difference in melt flow rate of the first propylene-based polymer and the second propylene-based polymer is more than 20%, based on the lower melt flow rate; (ii) a difference in tensile strength at yield between the first propylene-based polymer and the second propylene-based polymer is more than 20%, based on the lower tensile strength at yield; and (iii) a difference in tensile stress at yield between the first propylene-based polymer and the second propylene-based polymer is more than 20% based on the lower tensile stress at yield.

7. The combination according to claim 1, wherein the second propylene copolymer is an ethylene-propylene copolymer present in an amount of about 15 wt % to about 22 wt %, based on the weight of second ICP.

8. The combination according to claim 7, wherein the ethylene-propylene copolymer comprises about 30 wt % to about 45 wt % ethylene-derived units, based on the weight of the ethylene-propylene copolymer.

9. The combination according to claim 1, wherein a weight ratio of the first propylene-based polymer to the second propylene-based polymer ranges from about 10:90 to about 90:10.

10. A composition comprising the combination according to claim 1.

11. The composition according to claim 10, further comprising:

at least one component selected from the group consisting of polyolefin plastomers, polyolefin elastomer and filler.

12. The composition according to claim 11, wherein a total content of the first propylene-based polymer and the second propylene-based polymer in the composition ranges from about 45 wt % to about 80 wt %, based on the weight of the composition.

13. A component comprising the composition according to claim 10.

14. A process for making a component, comprising the steps of:

(a) setting a target shrinkage rate;

(b) preparing a component comprising the composition according to claim 10; and (c) adjusting a weight ratio of the first propylene-based polymer to the second propylene-based polymer to obtain the target shrinkage rate.

15. The process according to claim 14, wherein step (c) comprises increasing the weight ratio of the first propylene-based polymer to the second propylene-based polymer when the shrinkage rate of the component in step (b) is lower than the target shrinkage rate.

16. The process according to claim 14, wherein step (c) comprises decreasing the weight ratio of the first propylene-based polymer to the second propylene-based polymer when the shrinkage rate of the component in step (b) is higher than the target shrinkage rate.

17. A propylene-based impact copolymer (ICP) comprising a polypropylene homopolymer and within a range of about 15 wt % to about 22 wt % of a propylene copolymer based on the weight of the ICP, wherein the propylene copolymer is an ethylene-propylene copolymer comprising about 30 wt % to about 45 wt % ethylene-derived units and the remainder propylene-derived units, based on the weight of the propylene copolymer; and wherein the ICP has a shrinkage rate of less than 1.4%.

18. The ICP according to claim 17, wherein the ICP has at least one of the following properties: (i) a melt flow rate (MFR) (230° C./2.16 kg, ASTM D1238) of about 45 g/10 min to about 55 g/10 min, (ii) an MFR of the polypropylene homopolymer of about 100 g/10 min to about 130 g/10 min, and (iii) an intrinsic viscosity of the propylene copolymer of about 1.8 dL/g to about 4 dL/g.

19. The ICP according to claim 18, wherein the ICP further comprises a filler in an amount of about 0.2 wt % to about 1 wt %, based on the weight of ICP.

20. The ICP according to claim 17, wherein the ethylene-propylene copolymer comprises about 40 wt % to about 45 wt % ethylene-derived units and the remainder propylene-derived units, based on the weight of the propylene copolymer.

* * * * *